(12) United States Patent
Kutsumi et al.

(10) Patent No.: US 9,216,531 B2
(45) Date of Patent: Dec. 22, 2015

(54) RING VALVE GATE MOLD DEVICE

(71) Applicant: JTEKT CORPORATION, Osaka-shi, Osaka (JP)

(72) Inventors: Hiroshi Kutsumi, Takarazuka (JP); Kinichi Yokoyama, Yonezawa (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/556,447

(22) Filed: Dec. 1, 2014

(65) Prior Publication Data

US 2015/0158224 A1 Jun. 11, 2015

(30) Foreign Application Priority Data

Dec. 9, 2013 (JP) .................................. 2013-253938

(51) Int. Cl.
| | |
|---|---|
| *B29C 45/23* | (2006.01) |
| *B29C 45/28* | (2006.01) |
| *B29C 45/26* | (2006.01) |
| *B29C 45/73* | (2006.01) |
| *B29C 45/27* | (2006.01) |
| *B29L 31/00* | (2006.01) |

(52) U.S. Cl.
CPC ............. *B29C 45/28* (2013.01); *B29C 45/2616* (2013.01); *B29C 45/2737* (2013.01); *B29C 45/73* (2013.01); *B29C 45/27* (2013.01); *B29C 45/2806* (2013.01); *B29C 2045/2862* (2013.01); *B29L 2031/7096* (2013.01)

(58) Field of Classification Search
CPC .............................. B29C 45/27; B29C 45/2806
USPC .......................................... 425/549, 562, 566
See application file for complete search history.

(56) References Cited

U.S. PATENT DOCUMENTS

| | | | |
|---|---|---|---|
| 4,394,117 A | 7/1983 | Taylor | |
| 4,405,540 A | 9/1983 | Mayer | |
| 4,808,106 A * | 2/1989 | Von Holdt | ..................... 425/547 |
| 5,785,915 A | 7/1998 | Osuna-Diaz | |
| 6,830,447 B2 * | 12/2004 | Babin | ......................... 264/328.9 |

FOREIGN PATENT DOCUMENTS

| | | |
|---|---|---|
| JP | 2003-071880 A | 3/2003 |
| JP | B2-4203903 | 1/2009 |

OTHER PUBLICATIONS

May 13, 2015 Extended Search Report issued in European Patent Application No. 14195910.6.

* cited by examiner

*Primary Examiner* — Tim Heitbrink
(74) *Attorney, Agent, or Firm* — Oliff PLC

(57) ABSTRACT

A ring valve gate mold device includes: a stationary mold and a movable mold that are disposed so as to be allowed to be joined together and separated from each other; an annular cavity used to form an annular product, the cavity being formed in a mating face that is an upper face of the movable mold; a supply passage through which molten resin is supplied via a circular gate connected to the entire circumference of the annular cavity; and a valve body that opens and closes the circular gate of the supply passage. The valve body is a tubular sleeve body that moves in the axial direction of the ring valve gate mold device to open and close the circular gate. The sleeve body is disposed at a position radially outward of the supply passage connected to the gate.

6 Claims, 3 Drawing Sheets

RING VALVE GATE MOLD DEVICE

INCORPORATION BY REFERENCE

The disclosure of Japanese Patent Application No. 2013-253938 filed on Dec. 9, 2013 including the specification, drawings and abstract, is incorporated herein by reference in its entirety.

BACKGROUND OF THE INVENTION

1. Field of the Invention

The invention relates generally to a ring valve gate mold device. More specifically, the invention relates to a ring valve gate mold used to produce an annular (ring-shaped) resin product by injection molding.

2. Description of the Related Art

When an annular resin product (ring-shaped product such as a pulsar ring, a cage, or a gear) is produced by injection molding using a resin-molding mold, if a gate, through which molten resin is supplied into a cavity for forming the resin product, is a single point on the circumference of the annularly-formed cavity, a resin merging point called a weld is created by injection molding. This makes a part of the product extremely low in strength compared with the other parts of the product. Therefore, as described in Japanese Patent No. 4203903, a ring valve gate mold, in which a gate is opened over the entire circumference of the annularly-formed cavity, is used for molding an annular resin product by injection molding. In this way, creation of a weld is prevented. In the ring valve gate mold described in Japanese Patent No. 4203903, one mold, which is a stationary mold, and the other mold, which is a movable mold, are disposed such that their mating faces can be joined together or separated from each other. An annular cavity having a product shape is formed in the mating face of the movable mold. Molten resin is supplied through the gate that is opened over the entire circumference of the annular cavity. The molten resin is supplied to the gate through a supply passage formed into a cylindrical shape. Opening and closing the gate with a valve body disposed at the gate causes the molten resin supplied to the gate to be supplied into the cavity and to be blocked from flowing into the cavity. The valve body disposed at the gate is a tubular sleeve body, and is disposed so as to be movable in the axial direction to open and close the gate. The tubular sleeve body is disposed at a position radially inward of the wall faces of the cylindrical supply passage and the gate through which the molten resin is supplied into the cavity. Therefore, heaters that keep the molten resin in the supply passage always in a molten state are all disposed at positions radially outward of the supply passage and the gate.

The ring valve gate mold having such a configuration as described above has no problem in molding a ring-shaped resin product having a relatively small diameter. However, the mold has limitations in molding a product having a relatively large diameter. This is because, in the ring valve gate mold having the above-described configuration, it is difficult to dispose a movable large sleeve body at a position on the inner peripheral side of the supply passage because the tubular sleeve body, as a valve body for opening and closing the gate, is disposed at a position on the inner peripheral side of the molten resin supply passage.

SUMMARY OF THE INVENTION

One object of the invention is to make it possible to produce an annular resin product having a relatively large diameter by disposing a valve body (tubular sleeve body) that opens and closes a gate in a ring valve gate mold device, at a position radially outward of a supply passage for supplying molten resin to a cavity through a gate.

An aspect of the invention relates to a ring valve gate mold device used to mold an annular resin product, the ring valve gate mold device including: one mold and the other mold that are disposed so as to be allowed to be joined together and separated from each other; an annular cavity used to foam an annular product, the cavity being formed in at least one of the one mold and the other mold; a supply passage through which molten resin is supplied via a circular gate connected to an entire circumference of the annular cavity; and a valve body that opens and closes the circular gate of the supply passage. The valve body is a tubular sleeve body that moves in an axial direction of the ring valve gate mold device to open and close the circular gate. The sleeve body is disposed at a position radially outward of the supply passage connected to the gate.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
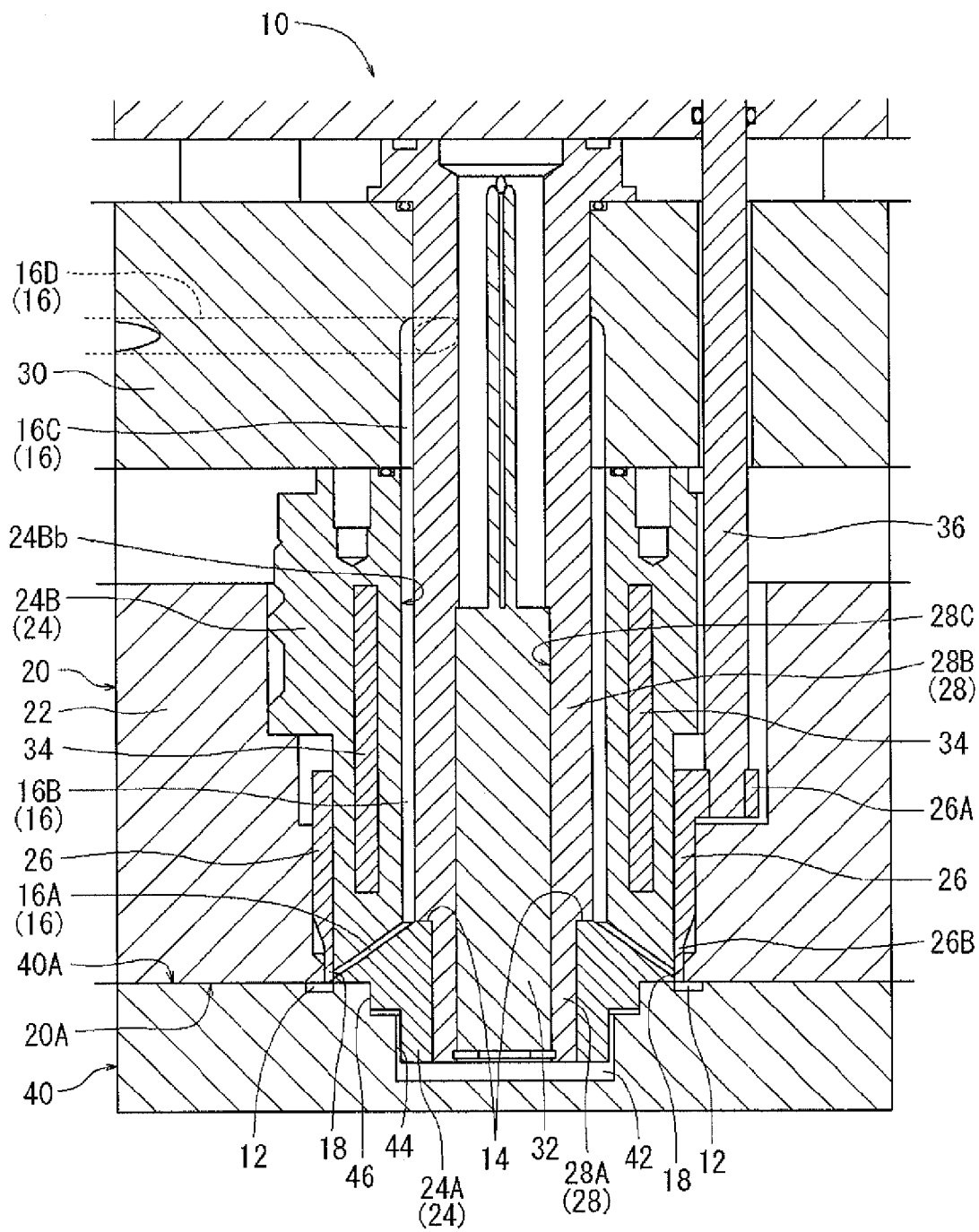
FIG. 1 is a sectional view illustrating a ring valve gate mold device according to an embodiment of the invention.

Hereinafter, example embodiments of the invention will be described with reference to the accompanying drawings. According to an embodiment of the invention, there is provided a ring valve gate mold device 10 (hereinafter, referred to simply as "mold device 10" in some cases) used for molding an annular (ring-shaped) resin product having a relatively large diameter. Examples of a large-diameter resin product include ring-shaped products such as a pulsar ring, a cage, and a gear. FIG. 1 is a sectional view illustrating main portions of the mold device 10 according to the embodiment. The mold device 10 is formed mainly of a stationary mold 20 that is one mold and a movable mold 40 that is the other mold. In the present embodiment, the stationary mold 20 is disposed on the upper side while the movable mold 40 is disposed on the lower side (i.e., the movable mold 40 is disposed below the stationary mold 20), and each of the stationary mold 20 and the movable mold 40 is formed of a mold. A lower face 20A of the stationary mold 20 and an upper face 40A of the movable mold 40 serve as mating faces 20A, 40A, respectively. The up-and-down movement of the movable mold 40 brings the mating faces 20A, 40A to a position where they are joined together or to positions where they are separated from each other. The up-and-down movement of the movable mold 40 is carried out by a known driving device (not illustrated) such as a hydraulic device.

An annular (ring-shaped) cavity 12 is formed in the upper face 40A that is the mating face 40A of the movable mold 40. A fit-in recessed portion 42 is formed centering around the center of the cavity 12. A lower portion of a valve probe 24 of the stationary mold 20 is fitted into the fit-in recessed portion 42 when the movable mold 40 is joined to the stationary mold 20. The cavity 12 is formed at a position corresponding to a gate 18 that is formed at the distal end portion of a sleeve body 26, which may function as a valve body (described later). The cavity 12 is formed as a space having a shape that matches the product shape. The fit-in recessed portion 42 is formed as a circular hole with two steps, and is formed of a first tubular portion 44 and a second tubular portion 46. The outer peripheral portion of the valve probe 24 of the stationary mold 20 is formed so as to correspond to the tubular portions 44, 46, and the outer peripheral portion of the valve probe 24 is fitted into the tubular portions 44, 46. At the bottom portion that is defined by the first tubular portion 44 of the stepped fit-in recessed portion 42, a space is formed between the bottom portion and the lower end of the valve probe 24 when the stationary mold 20 and the movable mold 40 are joined together. In the present embodiment, the cavity 12 having the product shape is a space for forming a ring-shaped product having a relatively large diameter. Therefore, the valve probe 24 disposed radially inward of the cavity 12 is a component having a relatively large diameter corresponding to the diameter of the ring-shaped product to be molded.

The stationary mold 20 is formed mainly of a main mold 22, the valve probe 24, the sleeve body 26, which may function as a valve body, a core cylinder 28, a hot runner manifold 30, and two heaters 32, 34. When viewed from the position of the lower face 20A of the stationary mold 20, these components are disposed in the order of the core cylinder 28, an upper shaft portion 28B (a lower portion 24A), the sleeve body 26, and the main mold 22 from the center toward the outside in the radial direction. At a position at the upper side of the stationary mold 20, the core cylinder 28 and the hot runner manifold 30 are disposed in this order from the center toward the outside in the radial direction. The first heater 32 is disposed so as to be fitted in a hole of an inner cylinder portion 28C of the core cylinder 28, The second heater 34 is disposed in a circular pattern so as to be embedded inside the valve probe 24.

The core cylinder 28 is formed in a substantially cylindrical shape. As described above, the first heater 32 is disposed in the inner cylinder portion 28C. A lower shaft portion 28A of the core cylinder 28 is a stepped shaft portion with a diameter smaller than that of the upper shaft portion 28B located above a step portion 14. An inner cylinder portion of the lower portion 24A, which is located below the step portion 14, is screwed to the lower shaft portion 28A, so that the core cylinder 28 and the lower portion 24A are fixedly fitted together. A prescribed clearance is formed between the, upper shaft portion 28B of the core cylinder 28, which is located above the step portion 14 of the core cylinder 28 and the lower portion 24A, and an inner cylinder 24Bb of an upper portion 24B, which is located above the step portion 14 of the core cylinder 28 and the lower portion 24A. The clearance constitutes a part 16B of a supply passage 16 through which molten resin is supplied into the cavity 12. A supply passage 16A is formed so as to extend from the lower end position of the supply passage 16B, that is, from the position of the step portion 14, obliquely downward in the radial direction toward the outside of the lower portion 24A. The opening of the supply passage 16A that is opened at the outer peripheral face of the lower portion 24A is connected to the cavity 12 through the gate 18 that is opened and closed by the sleeve body 26, which may function as a valve body. The gate 18 of the supply passage 16 is formed by opening and closing the passage, which is connected to the cavity 12 formed between the outer peripheral face of the valve probe 24 at a portion below the position at which the supply passage 16A is opened and the inner cylinder portion that is the lower portion of the main mold 22. Thus, the gate 18 is formed as a circular gate that is connected to the cavity 12.

The sleeve body 26, which may function as a valve body, is disposed between the valve probe 24 and the main mold 22 so as to be movable up and down. The sleeve body 26 is configured so as to move up and down as a piston rod 36, which is coupled to an upper-end flange 26A of the sleeve body 26, is activated by a pneumatic drive source (not illustrated). The sleeve body 26 is formed in a substantially cylindrical shape, and has a lower end 26B formed as a thin-wall cylinder that enters and retracts from the circular clearance that forms the gate 18, thereby closing and opening the gate 18. The hot runner manifold 30 is disposed so as to be fitted on the upper portion of the core cylinder 28. The lower face of the hot runner manifold 30 is joined to the upper end face of the valve probe 24, and the hot runner manifold 30 and the valve probe 24 are fixedly fitted together with a fastening such as a bolt. A molten resin supply passage 16D as indicated by dashed lines is formed in the hot runner manifold 30. The supply passage 16D is formed of a single passage, and is connected to a supply passage 16C formed between the hot runner manifold 30 and the core cylinder 28. Like the above-described supply passage 16B, the supply passage 16C is formed as a tubular passage, and the supply passages 16B, 16C are formed as the continuous supply passage 16. In the present embodiment, the supply passages 16A, 16B, 16C are each circular in cross-section and formed so as to communicate with each other in the up-down direction, and the supply passages 16B, 16C are formed as a continuous cylindrical passage. In the present embodiment, the sleeve body 26, which may function as a valve body, is disposed at a position radially outward of the supply passages 16A, 16B, 16C each having a circular cross-section. When the sleeve body 26 is thus disposed at a position radially outward of the circular supply passages 16A, 16B, 16C, forming the sleeve body 26 with a larger diameter causes no particular problem even when the configuration in which the sleeve body 26 moves up and down to open and close the gate is adopted. Accordingly, the circular gate 18 can also be made larger in diameter, and the cavity 12 having the product shape, into which the molten resin is supplied through the gate 18, can also be made larger in diameter. This makes it possible to mold an annular resin product having a relatively large diameter.

As described above, the first heater 32 is disposed in the inner cylinder portion 28C of the core cylinder 28. The second heater 34 is embedded inside the valve probe 24 and disposed in a cylindrical form at a position radially outward of the supply passage 16B. The two heaters 32, 34 heat the molten resin in the supply passage 16 to properly maintain the molten state of the molten resin to be supplied into the cavity 12. In the present embodiment, especially because the molten resin in the supply passage 16 is heated from both the inner side and outer side of the supply passage 16 (16B) located close to the cavity 12, the molten resin is efficiently heated. In the present embodiment, as illustrated in FIG. 1, the two heaters 32, 34 are disposed at positions closer to the center of the annular cavity 12 than positions on the annular outer circumference of the cavity 12. In this way, despite the fact that the mold device 10 is used to produce a product having a relatively large diameter, a size increase is not particularly necessary to configure the mold device 10.

Figure 2:
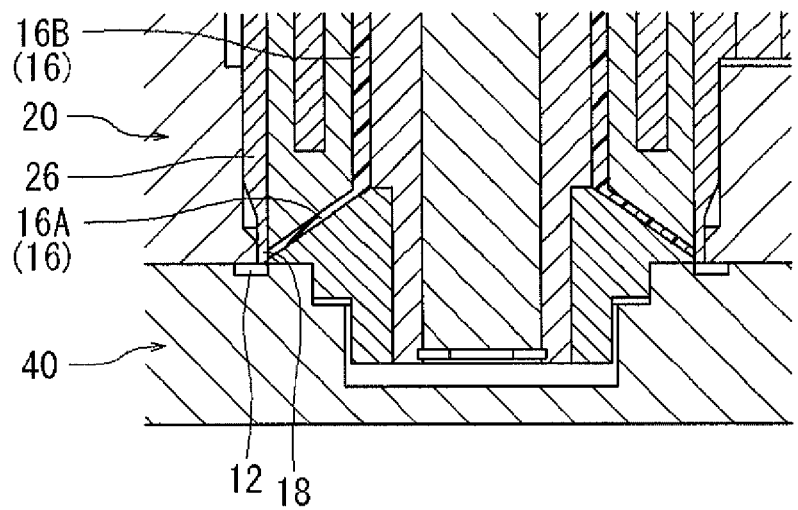
FIG. 2 is a sectional view illustrating a step in a mold closed state in the embodiment.
Figure 3:
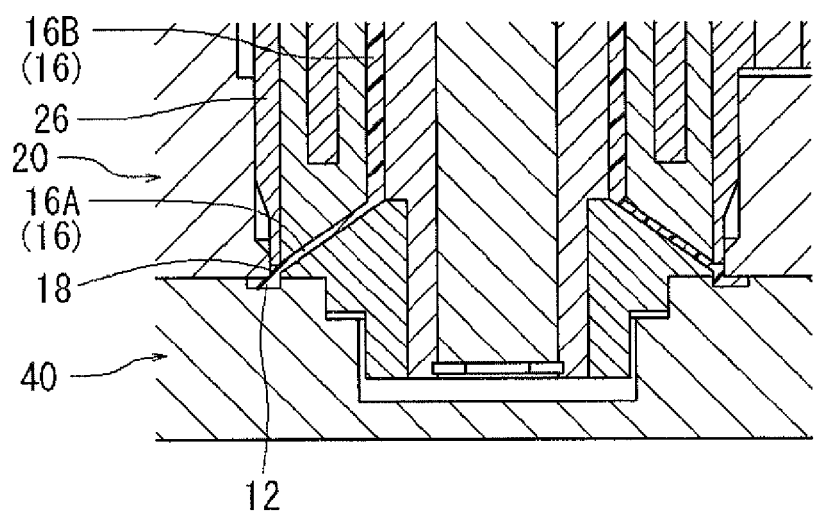
FIG. 3 is a sectional view illustrating a step in a gate open (injection) state in the embodiment.
Figure 4:
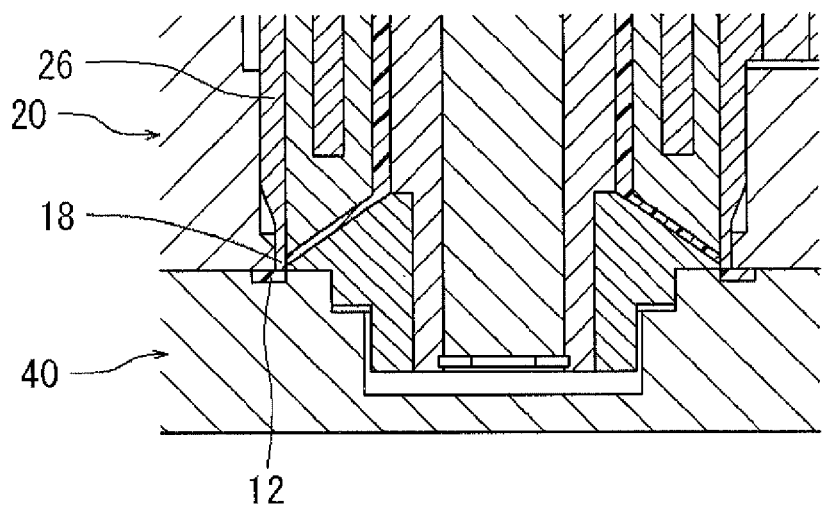
FIG. 4 is a sectional view illustrating a step in a gate closed state in the embodiment.
Figure 5:
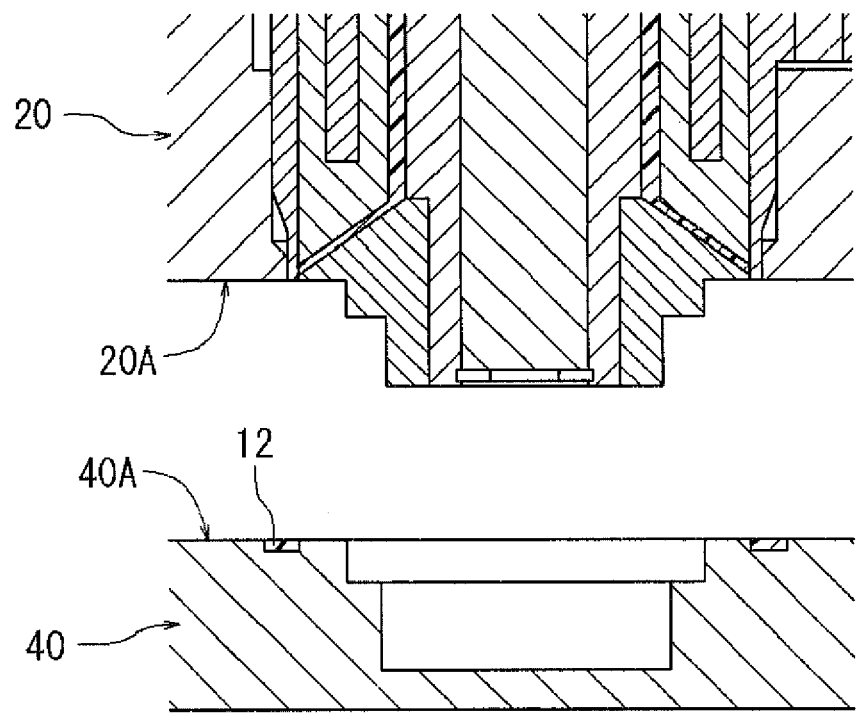
FIG. 5 is a sectional view illustrating a step in a mold open state in the embodiment.
Figure 6:
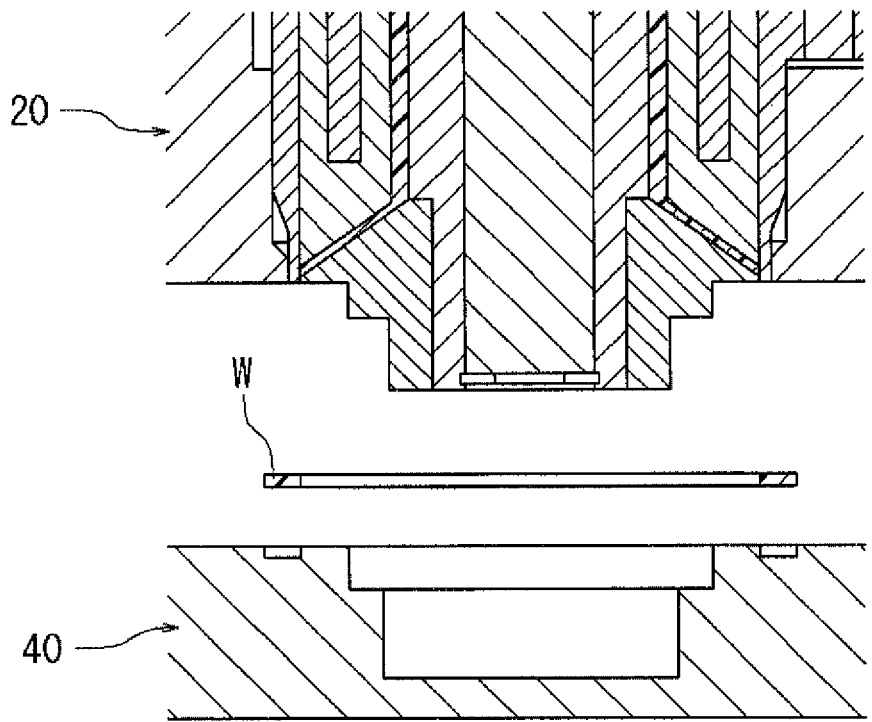
FIG. 6 is a sectional view illustrating a step in a product taken-out state in the embodiment.

Next, the molding operation performed by the mold device 10 will be described with reference to FIG. 2 to FIG. 6. FIG. 2 illustrates a closed state of the molds. The movable mold 40 has moved up to an upper position and is thus joined to the stationary mold 20. In addition, the sleeve body 26, which may function as a valve body, has moved down to a lower position, and thus the gate 18 is closed by the sleeve body 26. In this state, because the gate 18 is closed by the sleeve body 26, no molten resin is supplied from the supply passage 16 into the cavity 12. FIG. 3 illustrates a state of injection molding where the sleeve body 26 has been moved up from the state illustrated in FIG. 2 to open the gate 18. In this state, the gate 18 is in an opened state, so that the molten resin is supplied from the supply passage 16 into the cavity 12 through the gate 18. During this process, because the gate 18 is connected to the entire peripheral face of the annular cavity 12, the molten resin is supplied into the cavity 12 from the entire annular circumference of the gate 18. In this way, it is possible to prevent creation of a weld line in the resin molded article. FIG. 4 illustrates a state where the sleeve body 26 has been moved down to close the gate 18 after completion of injection molding of the molten resin in the cavity 12 illustrated in FIG. 3. In this state, the annular cavity 12 is filled with the molten resin. Through natural cooling of the molten resin, this molten resin is turned into an annular (ring-shaped) resin product having a shape corresponding to the cavity shape. FIG. 5 illustrates a state where, after the molten resin has turned into the resin product inside, the cavity 12 through natural cooling as illustrated in FIG. 4, the movable mold 40 has been moved down to a lower position and the mating face 20A of the stationary mold 20 and the mating face 40A of the movable mold 40 are separated from each other to take out the resin product. In this state, the resin product is placed at a position where the cavity 12 is formed in the movable mold 40. FIG. 6 illustrates a state where, with the molds 20, 40 being opened as illustrated in FIG. 5, the resin product W has been taken out from the position where the cavity 12 is formed in the movable mold 40. Repeating the operations illustrated in. FIG. 2 through FIG. 6 enables massive production of annular resin products having a relatively large diameter by injection molding.

According to the above-described embodiment, the sleeve body 26, which may function as a valve body, is disposed at a position radially outward of the supply passages 16A, 16B, 16C each having a circular cross-section, through which molten resin is supplied into the cavity 12 through the gate 18, and thus it is possible to form the cylindrical sleeve body 26 for opening and closing the gate 18, as a member having a large diameter. Accordingly, the annular cavity 12, to which the circular gate 18 is connected over the entire circumference, can also be made larger in diameter, so that it is possible to produce a resin product having a large diameter by injection molding.

While one embodiment of the invention has been described above, the invention may be implemented in various other embodiments. For example, two heaters are disposed in the above-described embodiment, but the number of heaters may be one or three. In addition, the heaters are respectively disposed at a position radially inward of the supply passage and a position radially outward of the supply passage in the above-described embodiment, but the heater may be disposed at one of a position radially inward of the supply passage and a position radially outward of the supply passage.

Having adopted the above-described configuration, the invention enables molding of a annular resin product having a relatively large diameter by disposing the valve body (cylindrical sleeve body), which opens and closes the gate in the ring valve gate mold device, at a position radially outward of the supply passage for supplying molten resin through the gate into the cavity.

What is claimed is:

1. A ring valve gate mold device adapted for molding an annular resin product, the ring valve gate mold device comprising:
   a first mold and a second mold that are disposed so as to be allowed to be joined together and separated from each other;
   an annular cavity adapted for forming an annular product, the cavity being formed in at least one of the first mold and the second mold;
   a supply passage disposed at a position radially outward of a core cylinder and through which molten resin is supplied via a circular gate connected to an entire circumference of the annular cavity; and
   a valve body that opens and closes the circular gate of the supply passage, wherein
   the first mold comprises as components, disposed in order from the center toward the outside in the radial direction, the core cylinder, an upper shaft portion thereof, a lower portion of the valve body, a sleeve body, and a main mold,
   a lower shaft portion of the core cylinder having a diameter smaller than that of the upper shaft portion, the upper shaft portion being located above a step portion and the lower shaft portion being located below the step portion, and an inner cylinder portion of the lower portion of the valve body, which is located below the step portion, is screwed to the lower shaft portion, so that the core cylinder and the lower portion of the valve body are fixedly fitted together,
   a prescribed clearance is formed between the upper shaft portion of the core cylinder and an inner cylinder of an upper portion of the valve body, the clearance constituting a part of the supply, which supply passage extends from the lower end position of said part of the supply from the position of the step portion obliquely downward in the radial direction toward the outside of the lower portion of the valve body, and
   the valve body is a tubular sleeve body that moves in an axial direction of the ring valve gate mold device to open and close the circular gate, and the sleeve body is disposed at a position radially outward of the supply passage connected to the gate.

2. The ring valve gate mold device according to claim 1, wherein a heater adapted for maintaining a molten state of the molten resin in the supply passage is disposed at a position radially inward of the supply passage.

3. The ring valve gate mold device according to claim 2, wherein the heater adapted for maintaining a molten state of the molten resin in the supply passage is disposed at a position closer to a center of the cavity adapted to form an annular product than a position on an annular outer circumference of the cavity.

4. The ring valve gate mold device according to claim 1, wherein the first mold is stationary and the second mold is movable.

5. The ring valve gate mold device according to claim 2, which additionally comprises a second heater disposed in a cylindrical form at a position radially outward of the supply passage.

6. The ring valve gate mold device according to claim 3, which additionally comprises a second heater disposed in a cylindrical form at a position radially outward of the supply passage.

\* \* \* \* \*